(12) United States Patent
Collins et al.

(10) Patent No.: US 6,581,687 B2
(45) Date of Patent: Jun. 24, 2003

(54) WATER-IN-OIL MICROEMULSIONS USEFUL FOR OIL FIELD OR GAS FIELD APPLICATIONS AND METHODS FOR USING THE SAME

(75) Inventors: Ian Ralph Collins, Sunbury-on-Thames (GB); Isabelle Vervoort, Aberdeen (GB)

(73) Assignee: BP Exploration Operating Company Limited, London (GB)

( * ) Notice: Subject to any disclaimer, the term of this patent is extended or adjusted under 35 U.S.C. 154(b) by 0 days.

(21) Appl. No.: 10/014,922

(22) Filed: Dec. 14, 2001

(65) Prior Publication Data

US 2002/0125010 A1 Sep. 12, 2002

Related U.S. Application Data

(63) Continuation of application No. PCT/GB00/02313, filed on Jun. 14, 2000.

(30) Foreign Application Priority Data

Jun. 29, 1999 (GB) ................................................ 9915214

(51) Int. Cl.⁷ .......................... E21B 37/00; E21B 43/22; E21B 43/25
(52) U.S. Cl. ........................ 166/263; 166/279; 166/310; 166/312; 507/266; 507/902
(58) Field of Search ................................ 166/263, 279, 166/304, 305.1, 310, 312, 371, 902; 507/266, 902

(56) References Cited

U.S. PATENT DOCUMENTS

| | | | |
|---|---|---|---|
| 3,254,714 A | 6/1966 | Goparty et al. | |
| 3,470,958 A | * 10/1969 | Kinney | 166/305.1 |
| 3,670,816 A | 6/1972 | Chenevert | |
| 3,688,851 A | 9/1972 | Ghenevert | |
| 3,783,945 A | * 1/1974 | Dauben et al. | 166/305.1 |
| 4,012,329 A | 3/1977 | Hayes et al. | |
| 4,518,511 A | * 5/1985 | Kaufman et al. | 166/279 |
| 4,650,000 A | * 3/1987 | Andreasson et al. | 166/307 |
| 4,681,912 A | 7/1987 | Durand et al. | |
| 4,741,399 A | 5/1988 | Hurd et al. | |
| 4,756,368 A | * 7/1988 | Ikuta et al. | 166/267 |
| 4,817,722 A | * 4/1989 | Montfort, Jr. et al. | 166/310 |
| 4,964,468 A | * 10/1990 | Adams et al. | 166/310 |
| 5,027,901 A | * 7/1991 | French et al. | 166/310 |
| 5,139,088 A | * 8/1992 | De Boer et al. | 166/267 |
| 5,186,257 A | 2/1993 | Stahl et al. | |
| 5,690,174 A | * 11/1997 | Chapman et al. | 166/275 |
| 5,762,138 A | * 6/1998 | Ford et al. | 166/279 |
| 6,148,913 A | * 11/2000 | Collins | 166/263 |

OTHER PUBLICATIONS

J. Falbe et al, "Rompp Chemie Leixkon" (1998), pp. 2678–2679, XP–002148648.

W.C. Griffin, "Kirk–Othmer Encyclopedia of Chemical Technology: Emulsions" (1979), pp. 900–930 (1979).

M. Bourrel et al, "Microemulsions and related systems." pp. 25–26 XP002148675 (1988).

* cited by examiner

Primary Examiner—George Suchfield
(74) Attorney, Agent, or Firm—Nixon & Vanderhye

(57) ABSTRACT

A microemulsion comprising (i) an oil phase, (ii) an aqueous phase comprising an aqueous solution of a water soluble oil field or gas field production chemical or an aqueous dispersion of a water dispersible oil field or gas field production chemical and (iii) at least one surfactant, wherein the aqueous phase is distributed in the oil phase in the form of droplets having a diameter in the range 1 to 1000 mn or in the form of microdominans having at least one dimension of length, breath or thickness in the range 1 to 1000 nm.

5 Claims, No Drawings

WATER-IN-OIL MICROEMULSIONS USEFUL FOR OIL FIELD OR GAS FIELD APPLICATIONS AND METHODS FOR USING THE SAME

This application is a continuation of Application No. PCT/GB00/02313, filed Jun. 14, 2000.

This invention relates to water in oil microemulsions and, in particular, to the use of water in oil microemulsions to deploy water soluble or water dispersible oil field or gas field production chemicals.

BACKGROUND OF THE INVENTION

Among oil field chemicals are scale inhibitors, which are used in production wells to stop scaling in the rock formation and/or in the production lines downhole and at the surface. Scaling not only causes a restriction in pore size in the rock formation matrix (also known as 'formation damage') and hence reduction in the rate of oil and/or gas production but also blockage of tubular and pipe equipment during surface processing. To overcome this, the production well is subjected to a so called "shut-in" treatment whereby conventionally an aqueous composition comprising a scale inhibitor is injected into the production well, usually under pressure, and "squeezed" into the formation and held there. In the squeeze procedure, scale inhibitor is injected several feet radially into the production well where it is retained by adsorption and/or formation of a sparingly soluble precipitate. The inhibitor slowly leaches into the produced water over a period of time and protects the well from scale deposition. The "shut-in" treatment needs to be done regularly e.g. one or more times a year at least if high production rates are to be maintained and constitutes the "down time" when no production takes place. Over the year there is a reduction in total production corresponding to the number of down times during the squeeze/shut-in operation, as well as reduced production as the scaling problem builds up. However, in some instances the scale inhibitor is poorly retained within the reservoir rock matrix and short squeeze lifetimes are experienced. The net result in these cases is frequent well interventions which impact on both well productivity and field profitability. It is also possible to "squeeze" corrosion inhibitors to protect the production tubing of the well bore against corrosion or asphaltene inhibitors to control precipitation of asphaltenes in the rock formation and in the production tubing. It would therefore be desirable to provide an improved method of deploying these inhibitors.

DESCRIPTION OF THE INVENTION

We have now discovered a means for and a method of increasing the effectiveness of oil field or gas field production chemicals, in particular scale inhibitors, thereby allowing a decrease in the frequency of squeeze/shut in operations and an increase in the oil/gas production rate.

The present invention relates to a microemulsion comprising (i) an oil phase, (ii) an aqueous phase comprising an aqueous solution of a water soluble oil field or gas field production chemical or an aqueous dispersion of a water dispersible oil field or gas field production chemical and (ii) at least one surfactant, wherein the aqueous phase is distributed in the oil phase in the form of droplets having a diameter in the range 1 to 1000 nm or in the form of microdomains having at least one dimension of length, breadth or thickness in the range 1 to 1000 nm.

An advantage of using a water in oil microemulsion for deploying water soluble or water dispersible oil field or gas field production chemicals as opposed to employing a conventional aqueous composition of the production chemical is that the amount of water pumped into the reservoir is minimised. This is important for wells containing low levels of water (less than 1% water) since injecting water into the well reduces the relative permeability of the oil and increases the relative permeability of the water. Until the amount of water in the formation near the well bore is reduced to pre-squeeze levels the productivity of the well will be lower than its pre-squeeze productivity. The use of a microemulsion having a continuous oil phase also has advantages for water-sensitive oil or gas reservoirs. In a water-sensitive oil or gas reservoir, clays may swell in the presence of water and/or water may become trapped, thereby preventing or reducing oil flow. Also, reducing the amount of water pumped into a reservoir having a sandstone rock formation minimises the production of sand which occurs when water dissolves the carbonate cements that consolidate the sandstone. A further advantage of deploying a production chemical using a water in oil microemulsion is that aqueous solutions of certain production chemicals (e.g. scale inhibitors) are fairly acidic and can increase the rate of dissolution of the carbonate cements. By encapsulating such acidic aqueous solutions in an oil, damage to the formation close to the wellbore can be eliminated or at least mitigated. Also, some wells are poorly pressure supported (low reservoir pressure) and are incapable of "lifting" a column of water out of the well. Conventionally, nitrogen gas lift is used to raise the column of water but this can be very expensive. By employing a water in oil microemulsion having an oil phase which is less dense than water, a column of the microemulsion can be lifted out of the well at a lower pressure than required for a column of water. The most significant advantage is that deploying a production chemical in a water in oil microemulsion increases the effectiveness of the production chemical by reducing the number of squeezing and shut-in operations. This is because "encapsulation" or protection of the oil field chemical within the oil continuous phase places the production chemical deeper into the rock formation (near well bore region) and the low interfacial tension of the microemulsion acts to remove oil from the surfaces of the porous rock formation thereby exposing more surface area for the production chemical to absorb or precipitate onto.

Microemulsions in general are known, see, for example "Microemulsions", Editor I D Robb, Plenum Press, New York, 1982 which is herein incorporated by reference. They differ from ordinary emulsions in having droplets of very small size or in having microdomains having at least one dimension of length, breadth or thickness of very small size. Thus, microemulsions appear clear to the naked eye or even the optical microscope, compared to the larger droplets (greater than 1000 nm diameter) of conventional cloudy emulsions.

Where the aqueous phase is distributed in the oil phase in the form of droplets, the droplets preferably have an average diameter in the range of 10 to 500 nm, more preferably 50 to 250 nm. The droplet size distribution is generally such that at least 90% of the diameters are within 20% or especially 10% of the average diameter. The microemulsions are transparent to the eye and are apparently isotropic.

Where the aqueous phase is distributed in the oil phase in the form of microdomains, the microdomains preferably have at least one dimension of length, breadth or thickness in the range 10 to 500 nm, more preferably 50 to 250 nm.

The oil phase is essentially any liquid which is immiscible with the aqueous phase. For example the oil phase may be selected from the group consisting of liquid alkanes (preferably $C_5$–$C_{20}$ alkanes, more preferably $C_8$ to $C_{15}$ alkanes, most preferably $C_9$–$C_{12}$ alkanes, for example, n-nonane, n-decane, and n-undecane), liquid alkyl halides (for example, carbon tetrachloride or dichloromethane) and liquid aromatic hydrocarbons (for example, toluene and xylene). The oil phase may also be a paraffin oil, a natural oil, diesel, kerosene, gas oil, crude oil, base oil, liquid carbon dioxide, liquid chlorofluorocarbons such as $CCl_2F_2$, $CHCl_2F$ and $CH_3CClF_2$ (known as freons), tetrahydrofuran, dimethyl formamide and dimethyl sulphoxide.

The aqueous phase in the microemulsion may comprise fresh, tap, river, sea, produced or formation water. The aqueous phase may have a total salinity of 0–250 g/l, for example 5–50 g/l. The aqueous phase may have a pH of 0.5–9. Where the aqueous phase comprises a sea-water solution of a highly acidic production chemical such as, for example, a scale inhibitor, the aqueous phase usually has a highly acidic pH of 0.1–1. In such cases it may be necessary to neutralise the acidity of the aqueous phase by using ammonium hydroxide or an alkali metal hydroxide, especially sodium hydroxide, potassium hydroxide or lithium hydroxide, in order to bring the pH of the formulation to within a preferred range of from 2–6. Preferably, the aqueous phase is neutralised prior to being mixed with the organic phase and surfactant to form the microemulsion.

The aqueous phase may comprise a water miscible solvent such as methanol, ethanol, n-propanol, iso-propanol, n-butanol, iso-butanol, tert-butanol, butyl monoglycol ether, butyl diglycol ether, butyl triglycol ether, ethylene glycol mono butyl ether and ethylene glycol. Without wishing to be bound by any theory, it is believed that the presence of a water miscible solvent in the aqueous phase stabilises the microemulsion so that less surfactant is required to form a stable microemulsion. The amount of water miscible solvent which may be present in the aqueous phase is in the range 0.5 to 50% by weight, preferably 5 to 30% by weight based on the total weight of water and water miscible solvent.

The volume fraction of the aqueous phase in the microemulsion is generally in the range from 1–50%, preferably 10 to 40%, more preferably 23 to 30%.

Preferably, the microemulsion comprises at least two surfactants, more preferably two surfactants. Suitably, the surfactant(s) may be an anionic surfactant or a non-ionic surfactant i.e. a surfactant having anionic and non-ionic head groups respectively. Examples of anionic head groups include sulfosuccinate, sulfate, phosphate and sulfonate groups. Suitable counter-ions to the anionic head groups include sodium, potassium and ammonium cations. Suitable non-ionic head groups include alkoxylate groups. Typically, the surfactant(s) may have one or more hydrocarbyl tail groups, for example 1 to 3 hydrocarbyl tail groups. The hydrocarbyl tail group(s) may be a halogenated hydrocarbyl group such as a fluorinated hydrocarbon group. Generally, the hydrocarbyl tail group is an alkyl group having a chain length of at least 5 carbon atoms, preferably at least 8 carbon atoms. Preferably, the hydrocarbyl tail group is an alkyl group having a chain length of from 5 to 18 carbon atoms, more preferably 8 to 16 carbon atoms, most preferably 10 to 14 carbon atoms, for example, 12 carbon atoms.

Examples of suitable anionic surfactants include sodium dioctyl sulfosuccinate, sodium dodecyl sulfate, sodium nonyl sulfate, sodium decyl sulphate, sodium ethylhexyl phosphate, sodium ethylhexyl sulfosucinate, sodium pentyl sulfosuccinate, sodium hexyl sulfosuccinate, sodium dodecyl phenyl sulfonate, sodium dodecyl orthoxylene sulfonate, or sodium dodecyl naphthalene sulphonate Suitable non-ionic surfactants include alkyl monophosphate esters and non-ionic surfactants of formula I:

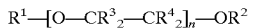

wherein $R^1$ is a hydrocarbyl tail group have the preferred features described above and n is an integer in the range 1–8, preferably 2–6, for example 2–4.

$R^2$ may be selected from the group consisting of H, an alkyl group, a cycloalkyl group and an aryl group. Preferably $R^2$ is selected from the group consisting of H, a $C_1$–$C_4$ alkyl group, cyclohexyl or phenyl, more preferably H, methyl or ethyl. The $R^3$ and $R^4$ groups are independently selected from the group consisting of H, a $C_1$–$C_4$ alkyl group, a halide, OH and $OR^5$ (where $R^5$ is an alkyl group, preferably a $C_1$–$C_4$ all group). Preferably the $R^3$ and $R^4$ groups are selected from H or methyl, more preferably H.

Examples of suitable surfactants of formula (I) include $CH_3$—$(CH_2)_{11}$—$(O$—$CH_2$—$CH_2)_3$—$OH$, $CH_3$—$(CH_2)_9$—$(O$—$CH_2$—$CH_2)_3$—$OH$, $CH_3$—$(CH_2)_{11}$—$(O$—$CH_2$—$CH_2)_4$—$OH$, $CH_3$—$(CH_2)_{11}$—$(O$—$CH_2$—$CH_2)_2$—$OH$, and $CH_3$—$CH_2)_{11}$—$(O$—$CH_2$—$CH_2)_4$—$OH$, $CH_3$—$(CH_2)_{11}$—$(O$—$CH_2$—$CH_2)_5$—$OH$.

The surfactant may also be a non-ionic surfactant of the formulae II or III:

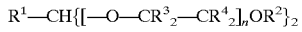

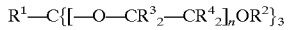

wherein $R^1$, $R^2$, $R^3$, $R^4$ and n are as defined above.

The surfactant is suitably present in the microemulsion in an amount ranging from 1 to 20% by weight, preferably 2 to 15% by weight, for example 5 to 13% by weight.

The oil field or gas field production chemical may be an inhibitor of: (i) corrosion, (ii) scale, (iii) gas hydrate formation, (iv) wax or (v) asphaltene deposition; or, may be a hydrogen sulphide scavenger or wax dispersant. The scale inhibitor is effective in stopping calcium and/or barium scale with threshold amounts rather than stoichiometric amounts It may be a water-soluble organic molecule with at least 2 carboxylic and/or phosphonic acid and/or sulphonic acid groups e.g. 2–30 such groups. Preferably the scale inhibitor is an oligomer or a polymer, or may be a monomer with at least one hydroxyl group and/or amino nitrogen atom, especially in a hydroxycarboxylic acid or hydroxy or aminophosphonic, or, sulphonic acid. The inhibitor is used primarily for inhibiting calcium and/or barium scale. Examples of such compounds used as inhibitors are aliphatic phosphonic acids with 2–50 carbons, such as hydroxyethyl diphosphonic acid, and aminoalkyl phosphonic acids, e.g. polyaminomethylene phosphonates with 2–10 N atoms e.g. each bearing at least one methylene phosphonic acid group; examples of the latter are ethylenediamine tetra(methylene phosphonate), diethylenetramine penta(methylene phosphonate) and the triamine- and tetramine-polymethylene phosphonates with 2–4 methylene groups between each N atom, at least 2 of the numbers of methylene groups in each phosphonate being different (e.g. as described further in published EP-A479462, the disclosure of which is herein incorporated by reference). Other scale inhibitors are polycarboxylic acids such as acrylic, maleic, lactic or tartaric acids, and polymeric anionic compounds such as polyvinyl sulphonic acid and poly(meth)acrylic acids, optionally with at least some phosphonyl or phosphinyl groups as in phosphinyl polyacrylates. The scale inhibitors are suitably at least partly in the form of their alkali metal salts e.g. sodium salts.

Examples of corrosion inhibitors are compounds for inhibiting corrosion on steel, especially under anaerobic conditions, and may especially be film formers capable of being deposited as a film on a metal surface e.g. a steel surface such as a pipeline wall. Such compounds may be non-quaternised long aliphatic chain hydrocarbyl N-heterocyclic compounds, where the aliphatic hydrocarbyl group may be as defined for the hydrophobic group above; mono- or di-ethylenically unsaturated aliphatic groups e.g. of 8–24 carbons such as oleyl are preferred. The N-heterocyclic group can have 1–3 ring nitrogen atoms with 5–7 ring atoms in each ring; imidazole and imidazoline rings are preferred. The ring may also have an aminoalkyl e.g. 2-aminoethyl or hydroxyalkyl e.g. 2-hydroxyethyl substituent. Oleyl imidazoline may be used.

The gas hydrate inhibitor may be a solid polar compound, which may be a polyoxyalkylene compound or alkanolamide, or tyrosine or phenylalanine.

The asphaltene inhibitor may be an amphoteric fatty acid or a salt of an alkyl succinate while the wax inhibitor may be a polymer such as an olefin polymer e.g. polyethylene or a copolymeric ester, e.g. ethylene-vinyl acetate copolymer, and the wax dispersant may be a polyamide. The hydrogen sulphide scavenger may be an oxidant, such as an inorganic peroxide, e.g. sodium peroxide, or chlorine dioxide, or an aldehyde e.g. of 1–10 carbons such as formaldehyde or glutaraldehyde or (meth)acrolein.

The amount of production chemical used is in the range from 1–25% w/w of the aqueous phase, suitably from 5–15% w/w, preferably from 6–10% w/w. Within these ranges the amount used would depend upon the nature of the chemical used and its intended purpose.

In another aspect the present invention provides a method of introducing an oil or gas field production chemical into a rock formation comprising oil and/or gas, which comprises passing the microemulsion of the present invention down a production well and then into the formation.

In particular, the present invention provides a method for increasing the effectiveness of a water soluble or water dispersible oil or gas field production chemical by reducing the number of squeezing and shut-in operations needed to increase the production rate from an oil well or gas well, said method comprising:

A) injecting into an oil-bearing or gas-bearing rock formation matrix a microemulsion comprising (i) an oil phase, (ii) an aqueous phase comprising an aqueous solution of a water soluble oil field or gas field production chemical or an aqueous dispersion of an oil field or gas field production chemical, and (iii) at least one surfactant, wherein the aqueous phase is distributed in the oil phase in the form of droplets having a diameter in the range 1 to 1000 nm or in the form of microdomains having at least one dimension of length, breadth or thickness in the range 1 to 1000 nm;

B) after injecting the microemulsion, optionally over-flushing the oil or gas bearing rock formation with an oil; and, C) subsequently, shutting-in the well for a period of time.

It is important that the microemulsion is thermally stable. It is possible to devise microemulsions which are stable over a wide temperature range e.g. from ambient to the temperature of the production well (e.g. from 90 to about 150° C.). However, it is not essential that the microemulsion is stable across the whole of the range of from ambient to 150° C. For example, the microemulsion may be stable between ambient and 70° C. or between 40 and 80° C. In the present invention, when the microemulsion is injected under pressure into the production well, the production chemical(s) in the microemulsion is adsorbed by the rock formation matrix and is retained for relatively long periods.

The microemulsion forms spontaneously on gentle mixing of the aqueous phase, the oil phase and the surfactant in any order, conveniently, the aqueous phase is mixed last into a mixture of the oil phase and the surfactant. If the material made is initially cloudy, then a microemulsion has not been produced, and minor adjustments to the relative proportions of the ingredients or a change in the nature of the surfactant or the temperature may be needed. The microemulsion can be characterised by x-ray diffraction to show the presence of the droplets or domains. Where the aqueous phase of the microemulsion comprises an aqueous solution of a water soluble oil or gas field production chemical, the microemulsion is optically clear. Where the aqueous phase of the microemulsion comprises a dispersion of a water dispersible oil or gas field production chemical the microemulsion will not be optically clear; however, the microemulsion will not have the cloudy or milky appearance of a conventional emulsion. Preferably, the viscosity of the microemulsion may be in the range 0.4–10, such as 0.5–5 cps at a temperature of 50° C., allowing the microemulsion to be easily pumped downhole. The microemulsion may be prepared on site immediately prior to use or may be transported as such to the site of use. In the case of an oil well, the microemulsion can be injected, suitably under pressure, into an oil bearing zone, e.g. rock formation matrix, via a producing well e.g. down the core. The microemulsion is then left ("shut-in") in the oil bearing zone while oil production is stopped temporarily. During this process, the injected microemulsion percolates through the oil bearing zone under the injection pressure. In the shut-in period, the injected microemulsion comes into contact with reservoir fluids. This is the so called "squeezing" effect which enables the maintenance of oil recovery from such zones. A desirable contact time of 4–30 hrs e.g. 6–20hrs is often achievable with the formulations of the present invention. The shut-in process involving the introduction of the microemulsion can be optionally preceded by a pre-flush of the oil-bearing rock formation matrix using an oil such as diesel, biodiesel, kerosene, base oil or crude oil. Introduction of the microemulsion is followed by a subsequent separate step of over-flushing the production well with an oil. The oil used for the over-flush may be diesel, biodiesel, kerosene, base oil or oil produced by the well being treated. The amount of oil used for over-flushing the production well is suitably such that it reaches and flushes a target zone which is up to about 20 feet from the well bore and is suitably in the range from 30 to 4000 bbls. Where the oil used for the over-flush is oil produced by the well being treated, the over-flush may be carried out in an inverse way e.g. as a back-sweep i.e. by making the crude oil as it emerges to the surface from the production well perform the function of the over-flush oil. After this period the oil production can be re-started. Where the production chemical is a scale inhibitor, the oil production rate will be initially high, as will the soluble calcium content of the produced water. Over time, e.g. 3–12 months, the rate of production will decrease and the soluble salt contents will also decrease signifying possible scaling problems in the rock formation, whereupon the production can be stopped and a fresh aliquot of the microemulsion injected into the well. Similar methods can be used to achieve asphaltene inhibition, wax inhibition or dispersion and hydrogen sulphide scavenging, while for corrosion and gas hydrate inhibition, the microemulsion is usually injected continuously downhole. For corrosion inhibition, wax inhibition or dispersion and hydrogen sulphide scavenging, the microemulsion may if desired be injected into the well without the overflush.

The invention also provides the use of the microemulsion of the invention to increase the effectiveness of the oil or gas field production chemical in a rock formation, in particular by increasing the retention of the chemical by the rock. The effectiveness of the chemical may be doubled in the case of scale inhibitors, so that less chemical is needed per year and the downtime due to application of the chemical and shut-in is reduced.

EXAMPLES

The present invention is illustrated by the following Examples.

EXAMPLE 1

A water in oil microemulsion was prepared by mixing:

75.5% by weight decane;

15.1% by weight seawater (containing 10% by weight of Calnox ML 3263 scale inhibitor, supplied by Baker Petrolite);

7.52% by weight of dioctyl sulfosuccinate sodium (AOT); and 1.88% by weight of sodium dodecyl sulfate.

The resulting micro-emulsion was stable at room temperature and up to a temperature of 70° C.

EXAMPLE 2

A water in oil microemulsion was prepared by mixing:

62.5% by weight decane;

25.0% by weight seawater (containing 10% by weight of Calnox ML 3263 scale inhibitor, supplied by Baker Petrolite);

8.75% by weight of dehydol LS 3 ($CH_3$—$(CH_2)_{11}$—(O—$CH_2$—$CH_2)_n$—OH where n is an average of 3); and 3.75% by weight of sodium dodecyl sulfate.

The resulting micro-emulsion was stable at a temperature of between 40 and 80° C.

The process of the present invention was tested using the following procedure:

A stainless steel tube (1.5 meters long, internal diameter 9.5 mm diameter) was dry packed with a mixture of sand and quartz powder, ≧250 mesh, ex Fluka (ratio of 84:16 by weight). The sand was crushed Clashach sandstone which provided a controlled permeability of about 240 milli Darcy. The steel tube was coiled, weighed and placed in an oven. The packed tube was initially flushed with sea-water (adjusted to a pH value of 2 using hydrochloric acid) at the rate of 60 ml/hour until the pH value of the effluent emerging from the sandpack was also 2. The pack was then removed and weighed to determine the liquid-pore volume of the pack. Thereafter, the sandpack was flushed with a fresh aliquot of Magnus formation water adjusted to a pH value of 5.5 at the rate of 60 ml/hour until the pH value of the emergent Magnus formation water from the sandpack was also 5.5. The oven was then switched on and raised to a temperature of 116° C. A confining over-pressure of approximately 20 bar was placed on the tube to maintain any fluids within the tube in a liquid state. When the pack had reached 116° C., the pack was flushed with Magnus Crude oil at 30 ml/hour (a total 100 ml of crude oil was injected using an oil injection vessel). The oil saturated pack was then flushed with Magnus formation water adjusted to pH value of 5.5 at the rate of 30 ml/hour until no oil was visible in the effluent water emerging from the pack. At this point the sandpack was believed to be at its residual oil concentration.

After this conditioning of the sandpack, the treatment was commenced. 2 pore volumes of a microemulsion was pumped into the conditioned sandpack at the rate of 30 ml/hour without any adjustment of the pH and this was shut in overnight (for approximately 17 hours). The sandpack was then flushed with Magnus formation water at a rate of 30 ml/hour. 60×4 ml samples fractions of the formation water emerging through the back pressure regulator were collected using a Gilson fraction collector, followed by 60×6 ml samples and 60×10 ml samples. These were analysed for scale inhibitor using the procedure described in "Development and Application of Accurate Detection and Assay Techniques for Oilfield Scale Inhibitors in Produced Water Samples" by G. M. Graham, K. S. Sorbie, L. S. Boak, K. Taylor and L. Blilie, Paper SPE 28997, presented at the SPE International Symposium on Oilfield Chemistry, San Antonio, Tex., USA, Feb. 14–17, 1995.

The relationship of the inhibitor level of the effluent to the volume of formation water passed through the sandpack (expressed as number of pore volumes of the solution) is a measure of the amount of inhibitor taken up by the rock formation initially and on its rate of release, i.e. a measure of the rate of removal of the inhibitor from the rock formation during production (i.e. its resistance to leaching) and hence is a measure of its effectiveness in inhibiting scaling with time. Two results of these experiments, one with the microemulsion described in Example 1 and the other with a control which contained the relevant inhibitor in an amount 6.6 times the microemulsion of Example 1 are tabulated below (Table 1).

TABLE 1

| Scale inhibitor in microemulsion | | Scale inhibitor in seawater (Comparative Test) | |
|---|---|---|---|
| Pore volume | [SI] (ppm) | Pore volume) | [SI] (ppm) |
| 0.7 | 209 | 2.65 | 20000 |
| 1.5 | 273 | 7.95 | 760 |
| 2.2 | 258 | 10.6 | 134 |
| 2.9 | 232 | 13.25 | 66 |
| 3.7 | 188 | 15.89 | 15 |
| 4.4 | 144 | 17.88 | 20 |
| 5.1 | 87 | 19.87 | 14 |
| 5.9 | 72 | 21.85 | 14 |
| 6.6 | 61 | 23.84 | 14 |
| 7.3 | 55 | | |
| 8.1 | 58 | | |
| 8.8 | 44 | | |
| 9.6 | 44 | | |
| 10.3 | 40 | | |
| 11.0 | 36 | | |
| 11.8 | 53 | | |
| 12.5 | 36 | | |
| 14.3 | 35 | | |
| 16.2 | 22 | | |
| 18.0 | 21 | | |
| 19.8 | 16 | | |
| 21.7 | 35 | | |
| 23.5 | 34 | | |
| 23.3 | 22 | | |
| 25.2 | 31 | | |
| 29 | 31 | | |
| 30.8 | 28 | | |
| 32.7 | 25 | | |
| 34.5 | 14 | | |
| 40.6 | 9.4 | | |
| 46.7 | 12.3 | | |

TABLE 1-continued

| Scale inhibitor in microemulsion | | Scale inhibitor in seawater (Comparative Test) | |
|---|---|---|---|
| Pore volume | [SI] (ppm) | Pore volume) | [SI] (ppm) |
| 52.9 | 5.8 | | |
| 59.0 | 7.4 | | |
| 65.1 | 3.4 | | |
| 70.6 | 5.8 | | |

We claim:

1. A method of introducing an oil or gas field production chemical into a rock formation comprising oil and/or gas, which comprises passing a microemulsion down a production well and then into the formation, said microemulsion comprising (i) an oil phase, (ii) an aqueous phase comprising an aqueous solution of a water soluble oil field or gas field production chemical or an aqueous dispersion of a water dispersible oil field or gas field production chemical and (iii) at least one surfactant, wherein the aqueous phase is distributed in the oil phase in the form of droplets having a diameter in the range 1 to 1000 nm or in the form of microdomains having at least one dimension of length, breadth or thickness in the range 1 to 1000 nm.

2. A method for increasing the effectiveness of a water soluble or water dispersible oil or gas field production chemical by reducing the number of squeezing and shut-in operations needed to increase the production rate from an oil well or gas well, said method comprising:

A) injecting into an oil-bearing or gas-bearing rock formation matrix a microemulsion comprising (i) an oil phase, (ii) an aqueous phase comprising an aqueous solution of a water soluble oil field or gas field production chemical or an aqueous dispersion of a water dispersible oil field or gas field production chemical and (iii) at least one surfactant, wherein the aqueous phase is distributed in the oil phase in the form of droplets having a diameter in the range 1 to 1000 nm or in the form of microdomains having at least one dimension of length, breadth or thickness in the range 1 to 1000 nm;

B) after injecting the microemulsion, optionally over-flushing the oil or gas bearing rock formation with an oil; and, C) subsequently, shutting-in the well for a period of time.

3. A method according to claim 2 which comprises a pre-flush step wherein an oil is introduced into the oil-bearing rock formation matrix prior to injecting the microemulsion.

4. A method according to claim 2 wherein the oil used for the over-flush is selected from diesel, biodiesel, kerosene, base oil or oil produced by the well being treated.

5. A method according to any one of claim 2 wherein the amount of oil used for over-flushing the oil well or gas well is in the range from 30 to 4000 bbls.

* * * * *